United States Patent [19] [11] 3,989,315
Murdoch [45] Nov. 2, 1976

[54] DRILL BIT

[75] Inventor: Henry W. Murdoch, Houston, Tex.

[73] Assignee: Reed Tool Company, Houston, Tex.

[22] Filed: Aug. 14, 1975

[21] Appl. No.: 604,627

[52] U.S. Cl. ............................................... 308/8.2
[51] Int. Cl.² .................................................. F16C 19/00
[58] Field of Search ............ 308/8.2; 175/375, 372, 175/371; 151/41.74

[56] References Cited
UNITED STATES PATENTS

| | | | |
|---|---|---|---|
| 2,676,790 | 4/1954 | Turner | 308/8.2 X |
| 3,862,762 | 1/1975 | Millsap | 308/8.2 X |
| 3,923,348 | 12/1975 | Peck | 308/8.2 |

*Primary Examiner*—M. H. Wood, Jr.
*Assistant Examiner*—Gene A. Church
*Attorney, Agent, or Firm*—Joe E. Edwards; Jack R. Springgate; Neal J. Mosely

[57] ABSTRACT

A drill bit having a roller cutter supported by ball bearings and a ball retainer retained in position both axially and rotationally within the ball loading hole by a plug which is mechanically wedged into secured and sealed position within the outer end of the ball loading hole.

5 Claims, 3 Drawing Figures

DRILL BIT

BACKGROUND OF THE INVENTION

With the continued improvements in roller cutter drill bits each portions of the structure which may possibly fail has come under intense scrutiny. With improvements in bearings, seals and lubrication systems the life of drill bits has been increased dramatically. One weakness of drill bits using ball bearings is that the ball bearings require the use of a passageway through the bit body for the loading of the balls after the roller cutter has been positioned on its journal and thereafter the ball loading hole has been closed by welding a plug in its outer end. It is believed that the welding of such plug has created problems which have limited the useful life of the drill bit. It is believed that the ball loading plug welds have been the source of fatigue failures due to heat affected zones, sharp corners formed at the edge of the hole and the weld metal and residual stresses. Further in an effort to avoid excessive temperatures to which the lubricant seal is exposed such welding has been done under water. In such cases the entry of water into the lubrication system would substantially limit the life of the drill bit.

SUMMARY

The present invention relates to an improved roller cutter drill bit.

An object of the present invention is to provide an improved roller cutter drill bit with improved drilling life.

Another object is to provide an improved roller cutter drill bit which is not subject to fatigue failure at the ball loading hole.

Still another object of the present invention is to provide an improved roller cutter drill bit having an improved system for retaining the ball bearings in their race and for sealing the roller cutter lubrication system.

BRIEF DESCRIPTION OF THE DRAWINGS

These and other objects and advantages are hereinafter set forth and explained with reference to the preferred forms of the present invention illustrated in the drawings wherein.

DESCRIPTION OF THE PREFERRED EMBODIMENTS

Figure 1:
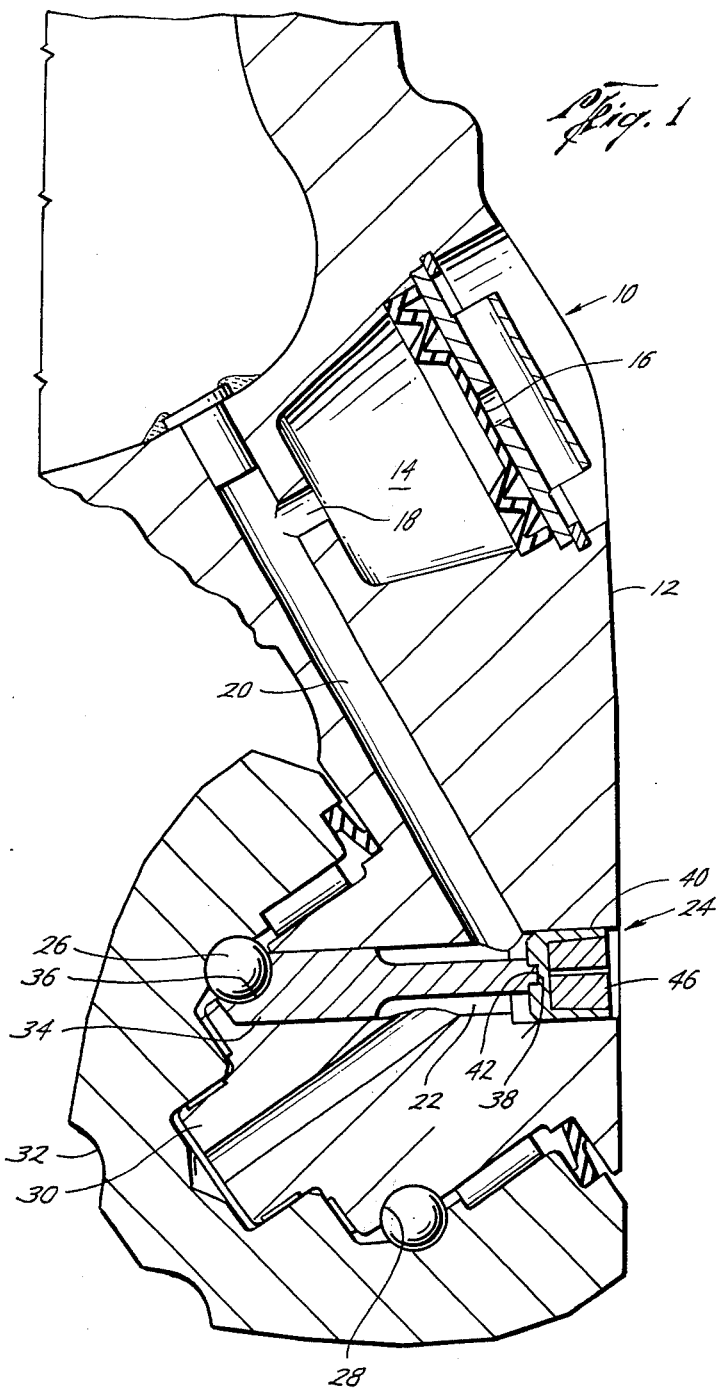
FIG. 1 is a partial sectional view of a drill bit constructed in accordance with the present invention.

In FIG. 1 a portion of drill bit 10 is shown including leg 12 which is in section to illustrate the lubrication system and the ball loading system. The drill bit 10 is shown with only one leg 12 but one or more of such legs may be included. The lubrication system is defined in leg 12 and includes the reservoir 14 sealed by the diaphragm 16, the passages 18 and 20 which communicated from reservoir 14 to the ball loading hole 22. The end of ball loading hole 22 is sealed by plug assembly 24 which is suitably secured in position as hereinafter explained.

After the ball bearings 26 have been loaded into their race 28 between journal 30 and roller cutter 32 the ball retainer 34 is positioned in ball loading hole 22. The inner end of ball retainer 34 is shaped at surface 36 to complete that portion of the surface of race 28 which is interrupted by ball loading hole 22.

Since the surface 36 of ball retainer 34 completes the surface of race 28 on which the balls 26 roll it is important that ball retainer 34 be retained in position so that its surface 36 conform to the surface of race 28. For this purpose ball retainer includes the projection 38 which extends across the width of retainer 34 and provides a part of the means for retaining the retainer 34 in its desired position within ball loading hole 22.

The hollow cup 40 is positioned in the outer portion of loading hole 22 and has the slot 42 which is defined in its inner end coacting with the projection 38 on retainer 34 to prevent retainer 34 from moving (rotationally and axially) to thereby assure that surface 36 conforms to race 28.

Figure 2:
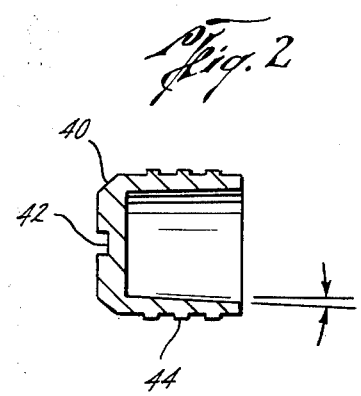
FIG. 2 is a sectional view of the hollow cup which functions to seal the outer end of the ball loading hole.

Cup 40 as shown in FIG. 2 is provided with suitable external ridges or lands 44 which assist in retaining and sealing cup 40 within the outer end of ball loading hole 22. The central plug 46 is positioned within the interior of hollow cup 40 to secure plug 40 in sealed engagement within the outer end of ball loading hole 22. Thus hollow cup 40 and plug 46 form the plug assembly 24.

A typical example of the structure sealing the outer end of ball loading hole 22 would be a cup 40 which is slipped into the outer end of ball loading hole 22 with close tolerances. For example, the hole 22 may have a diameter reamed to 0.5312 to 0.5337 inch and the cup 40 have an outside diameter of 0.531 inch and an internal taper of about one-half degree. The plug 46 may have an outside diameter of 0.494 inch with sides tapered at an angle of about one-half degree to match the tapered hole in cup 40. With the cup 40 positioned in its preferred position plug 46 is driven into cup 40 and the expansion of cup 40 locks the assembly in the outer portion of ball loading hole 22.

Figure 3:
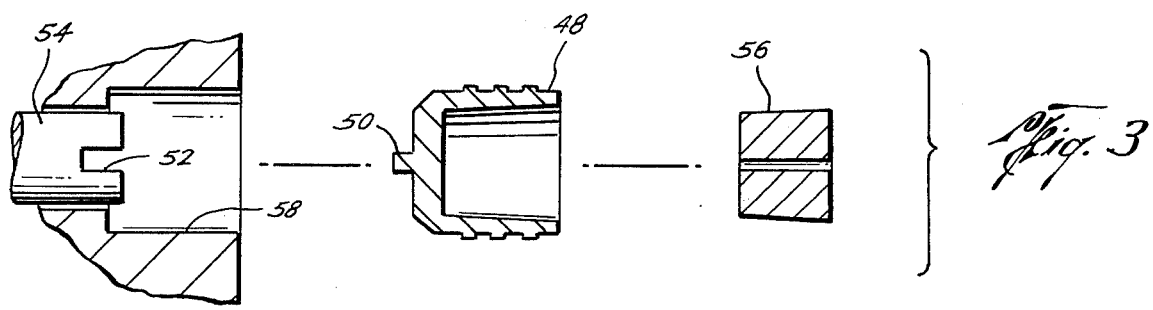
FIG. 3 is an exploded sectional view of a modified form of drill bit ball loading hole closure.

In the modified form of the structure shown in FIG. 3, the cup 48 is substantially similar to cup 40 except that it includes the transverse projection 50 which is received in the slot 52 of ball retainer 54. Plug 56 if forced into cup 48 to secure the assembly in position in the outer end of the ball loading hole 58.

The interconnection of the projections and slots of the retainers and the cups function to maintain the retainer in its desired position.

From the foregoing it can be seen that the present invention provides an improved drill bit structure which avoids the problems incident to welding the ball loading closure plug into the drill bit body and thereby provides a simplified structure having improved structural strength and does not adversely affect the seals for the lubrication system.

What is claimed is:

1. A drill bit comprising
a body,
a lubrication system defined within said body,
said body including a journal,
a roller cutter,
said journal and said roller cutter defining a ball race,
ball bearing means rotationally mounting said roller cutter on said journal and including a plurality of balls positioned in said ball race,
a ball loading hole extending through said body and communicating with said ball race,
a ball retainer positioned in said ball loading hole, and means for mechanically closing the outer end of said ball loading hole and for retaining said ball retainer in its desired position within said ball loading hole, including a plug assembly positioned within the outer portion of said ball loading hole and having a plug and means for mechanically expanding said plug into a secured, sealed engagement within the outer end of said ball loading hole, said plug interconnecting with said ball retainer to retain said ball retainer in its desired position within said ball loading hole.

2. A drill bit according to claim 1 wherein said plug is cup-shaped and said expanding means includes a tapered plug forced into said cup-shaped plug to expand said plug into tight sealed engagement within said ball loading hole.

3. A drill bit according to claim 2 wherein said cup-shaped plug includes a plurality of lands encircling the exterior of said plug.

4. A drill bit according to claim 1 wherein said ball retainer includes a transverse projection on the outer end thereof, and said plug includes a transverse slot in its inner end adapted to receive said projection to prevent movement of said ball retainer.

5. A drill bit according to claim 1 wherein said ball retainer defines a transverse slot on the outer end thereof, and said plug includes a transverse projection on its inner end adapted to be received in said slot to prevent movement of said ball retainer.

* * * * *